(12) United States Patent
Whaley et al.

(10) Patent No.: US 11,129,402 B2
(45) Date of Patent: Sep. 28, 2021

(54) INHIBITED WAXY STARCHES AND METHODS OF USING THEM

(71) Applicant: Tate & Lyle Ingredients Americas LLC, Hoffman Estates, IL (US)

(72) Inventors: Judith K. Whaley, Hoffman Estates, IL (US); Weichang Liu, Hoffman Estates, IL (US); Yuqing Zhou, Hoffman Estates, IL (US); Xian Chen, Hoffman Estates, IL (US); Leslie George Howarth, Hoffman Estates, IL (US); Mark Beltz, Hoffman Estates, IL (US)

(73) Assignee: Tate & Lyle Ingredients Americas LLC, Hoffman Estates, IL (US)

( * ) Notice: Subject to any disclaimer, the term of this patent is extended or adjusted under 35 U.S.C. 154(b) by 0 days.

(21) Appl. No.: 16/469,463

(22) PCT Filed: Dec. 15, 2017

(86) PCT No.: PCT/US2017/066755
§ 371 (c)(1),
(2) Date: Jun. 13, 2019

(87) PCT Pub. No.: WO2018/112383
PCT Pub. Date: Jun. 21, 2018

(65) Prior Publication Data
US 2019/0380370 A1    Dec. 19, 2019

Related U.S. Application Data

(60) Provisional application No. 62/434,921, filed on Dec. 15, 2016.

(51) Int. Cl.
*A23L 29/212*    (2016.01)
*C08B 30/14*    (2006.01)
*C08B 30/20*    (2006.01)

(52) U.S. Cl.
CPC ............ *A23L 29/212* (2016.08); *C08B 30/14* (2013.01); *C08B 30/20* (2013.01)

(58) Field of Classification Search
CPC ........ A23L 29/212; C08B 30/20; C08B 30/14
USPC ...................................................... 536/55.1
See application file for complete search history.

(56) References Cited

U.S. PATENT DOCUMENTS

| | | |
|---|---|---|
| 5,932,017 A | 8/1999 | Chiu et al. |
| 2001/0017133 A1 | 8/2001 | Chiu |
| 2003/0108649 A1 * | 6/2003 | Jeffcoat ............... C08B 31/12 426/578 |
| 2006/0172055 A1 | 8/2006 | Fryirs |
| 2009/0311408 A1 | 12/2009 | Yildiz et al. |
| 2013/0189420 A1 | 7/2013 | Tachibe |

FOREIGN PATENT DOCUMENTS

| | | |
|---|---|---|
| EP | 2 014 177 | 1/2009 |
| JP | 2012-223146 A | 11/2012 |
| JP | 2013-034414 A | 2/2013 |
| JP | 2013-110997 A | 6/2013 |
| WO | 96/04315 A1 | 2/1996 |
| WO | 2006/009528 A1 | 1/2006 |
| WO | 2013/173161 A1 | 11/2013 |
| WO | 2015132825 A1 | 9/2015 |

OTHER PUBLICATIONS

Rolland-Sabaté et al. Molecular and supra-molecular structure of waxy starches developed from cassava (*Manihot esculenta* Crantz). Carbohydrate Polymers 92 (2013) 1451-1462. (Year: 2013).*

Sanz et al., "Effect of thermally inhibited starches on the freezing and thermal stability of white sauces: Rheological and sensory properties", LWT—Food Science and Technology, vol. 67, Nov. 30, 2015, pp. 82-88.

International Search Report for International Application PCT/US2017/066755 dated Jun. 6, 2018, 5 pages.

Combined Search and Examination Report, U.K. Patent Application GB1707746.2, dated Sep. 18, 2017.

H. Ceballos et al., "Discovery of an amylose-free starch mutant in cassava (*Manihot esculenta* Crantz)," J. Agric. Food Chem., 55, 7469-76 (2007).

T. Sanchez et al., "Comparison of Pasting and Gel Stabilities of Waxy and Normal Starches from Potato, Maize, and Rice with Those of a Novel Waxy Cassava Starch under Thermal, Chemical and Mechanical Stress," J. Agric. Food Chem., 58, 5093-99 (2010).

* cited by examiner

*Primary Examiner* — Yih-Horng Shiao
(74) *Attorney, Agent, or Firm* — McDonnell Boehnen Hulbert & Berghoff LLP

(57) ABSTRACT

The present disclosure relates to inhibited waxy starches and methods for using them. One aspect of the disclosure is an inhibited waxy starch based on maize, wheat, or tapioca having an amylopectin content in the range of 90-100%; and a sedimentation volume in the range of 10-50 mL/g; in which the amylopectin fraction of the inhibited waxy starch based on maize, wheat, or tapioca has no more than 48.5% medium-length branches having a chain length from 13-24 (measured by a valley-to-valley method as described herein), and the starch is not pregelatinized. Methods of using the starch materials in food products are also described.

27 Claims, 5 Drawing Sheets

Procedure: Hold a plastic spoon at 45 degree. Do not poke the starch. Use the back of the spoon to gently press the starch about half way down and observe from the side how much clear water is squeezed out.

Graininess 3　　　　Graininess 7　　　　Graininess 11

INHIBITED WAXY STARCHES AND METHODS OF USING THEM

CROSS-REFERENCE TO RELATED APPLICATIONS

This application is a U.S. national phase application of International Patent Application no. PCT/US2017/066755, filed Dec. 15, 2017, which claims the benefit of priority of U.S. Provisional Patent Application No. 62/434,921, filed Dec. 15, 2016, which is hereby incorporated herein by reference in its entirety.

BACKGROUND OF THE DISCLOSURE

Field of the Disclosure

The present disclosure relates generally to starch products. More particularly, the present disclosure relates to inhibited waxy starches and methods relating to them, including methods for using them.

Technical Background

Waxy starches are starches that have a high percentage of their polysaccharide content in the form of amylopectin, i.e., as opposed to a mixture of amylopectin and amylose as in non-waxy starches. Waxy starch can provide a number of desirable properties to various foods. For example, waxy starches such as waxy corn starch and waxy tapioca starch can provide desirable texture and thickness to foods, such as bakery fillings (e.g., fruit fillings for pies), batters, breadings, sauces such as cheese sauces and gravies. Waxy starches typically provide a higher viscosity than the corresponding non-waxy starches.

Native starches, however, are typically not able to withstand the extreme conditions encountered during food processing, for example, high temperature and high shear stress. Moreover, native waxy starches are typically not able to retain desirable textural and rheological stability over a long shelf life, especially under refrigerated and/or freeze-thaw conditions. Chemical modification to produce hydroxypropyl starch or acetylated starch is often necessary to provide a starch with the desired stability for food uses. But chemical modification requires additional process steps and cost, and, perhaps even more importantly, is viewed by consumers as undesirable.

SUMMARY OF THE DISCLOSURE

One aspect of the disclosure is an inhibited waxy starch based on maize, wheat, or tapioca having an amylopectin content in the range of 90-100%; and a sedimentation volume in the range of 10-50 mL/g; in which the amylopectin fraction of the inhibited waxy starch based on maize, wheat, or tapioca has no more than 48.5% medium-length branches having a chain length of 13-24 (i.e., the degree of polymerization of the branch chain), as measured by the valley-to-valley method (i.e., described herein), and the starch is not pregelatinized. For example, in certain embodiments, the amylopectin fraction of the inhibited waxy starch based on maize, wheat, or tapioca has no more than 48.0% medium-length branches having a chain length from 13-24 as measured by the valley-to-valley method. In certain embodiments, the amylopectin fraction of the inhibited waxy starch based on maize, wheat, or tapioca has 46.0%-48.5%, 46.5%-48.5%, 47.0%-48.5%, 46.0%-48.0%, 46.5%-48.0% or 47.0%-48.0% medium-length branches having a chain length from 13-24 as measured by the valley-to-valley method.

Another aspect of the disclosure is an inhibited waxy starch based on maize, wheat, or tapioca as otherwise described herein, having an amylopectin content in the range of 90-100%; and a sedimentation volume in the range of 10-50 mL/g; in which the amylopectin fraction of the inhibited waxy starch based on maize, wheat, or tapioca has at least 28.0% short-length branches having a chain length from 6-12 as measured by the valley-to-valley method (i.e., as described herein), and the starch is not pregelatinized. For example, in certain embodiments, the amylopectin fraction of the inhibited waxy starch based on maize, wheat, or tapioca has at least 28.5% short-length branches having a chain length from 6-12 as measured by the valley-to-valley method. In certain embodiments, the amylopectin fraction of the inhibited waxy starch based on maize, wheat, or tapioca has 28.0%-31.0%, 28.0%-30.5%, 28.0-30.0%, 28.5%-31.0%, 28.5%-30.5% or 28.5%-30.0% short-length branches having a chain length from 6-12 as measured by the valley-to-valley method.

Another aspect of the disclosure is an inhibited waxy starch based on maize, wheat, or tapioca as otherwise described herein, having an amylopectin content in the range of 90-100%; and a sedimentation volume in the range of 10-50 mL/g; in which the ratio (DP13-24−DP6-12)/(DP13-24+DP6-12) is no more than 25.5% as measured by the valley-to-valley method, in which DP13-24 is the amount in the amylopectin fraction of the inhibited waxy starch based on maize, wheat, or tapioca of medium-length branches having a chain length from 13-24, and DP6-12 is the amount in the amylopectin fraction of the inhibited waxy starch based on maize, wheat, or tapioca of short-length branches having a chain length from 6-12 (both measured as described herein), and the starch is not pregelatinized. For example, in certain embodiments, the ratio (DP13-24−DP6-12)/(DP13-24+DP6-12) is no more than 25.0%, or even no more than 24.5% as measured by the valley-to-valley method. In certain embodiments, the ratio (DP13-24−DP6-12)/(DP13-24+DP6-12) is 22.0%-25.5%, 22.0%-25.0%, 22.0%-24.5%, 22.5%-25.5%, 22.5%-25.0%, 22.5%-24.5%, 23.0%-25.5%, 23.0%-25.0% or 23.0%-24.5% as measured by the valley-to-valley method.

Another aspect of the disclosure is an inhibited waxy starch based on maize, wheat, or tapioca having an amylopectin content in the range of 90-100%; and a sedimentation volume in the range of 10-50 mL/g; in which the amylopectin fraction of the inhibited waxy starch based on maize, wheat, or tapioca has no more than 54.5% medium-length branches having a chain length of 13-24 (i.e., the degree of polymerization of the branch chain), as measured by the drop-to-baseline method (i.e., described herein), and the starch is not pregelatinized. For example, in certain embodiments, the amylopectin fraction of the inhibited waxy starch based on maize, wheat, or tapioca has no more than 54.0% medium-length branches having a chain length from 13-24 as measured by the drop-to-baseline method. In certain embodiments, the amylopectin fraction of the inhibited waxy starch based on maize, wheat, or tapioca has 52.0%-54.5%, 52.5%-54.5%, 53.0%-54.5%, 52.0%-54.0%, 52.5%-54.0% or 53.0%-54.0% medium-length branches having a chain length from 13-24 as measured by the drop-to-baseline method.

Another aspect of the disclosure is an inhibited waxy starch based on maize, wheat, or tapioca as otherwise described herein, having an amylopectin content in the range of 90-100%; and a sedimentation volume in the range of 10-50 ml/g; in which the amylopectin fraction of the inhibited waxy starch based on maize, wheat, or tapioca has at least 30.5% short-length branches having a chain length from 6-12 as measured by the drop-to-baseline method (i.e., as described herein), and the starch is not pregelatinized. For example, in certain embodiments, the amylopectin fraction of the inhibited waxy starch based on maize, wheat, or tapioca has at least 31.0% short-length branches having a chain length from 6-12 as measured by the drop-to-baseline method. In certain embodiments, the amylopectin fraction of the inhibited waxy starch based on maize, wheat, or tapioca has 30.5%-33.5%, 30.5%-33.0%, 30.5%-32.5%, 31.0%-33.5%, 31.0%-33.0% or 31.0-32.5% short-length branches having a chain length from 6-12 as measured by the drop-to-baseline method.

Another aspect of the disclosure is an inhibited waxy starch based on maize, wheat, or tapioca as otherwise described herein, having an amylopectin content in the range of 90-100%; and a sedimentation volume in the range of 10-50 mL/g; in which the ratio (DP13-24−DP6-12)/(DP13-24+DP6-12) is no more than 28.0% as measured by the drop-to-baseline method, in which DP13-24 is the amount in the amylopectin fraction of the inhibited waxy starch based on maize, wheat, or tapioca of medium-length branches having a chain length from 13-24, and DP6-12 is the amount in the amylopectin fraction of the inhibited waxy starch based on maize, wheat, or tapioca of short-length branches having a chain length from 6-12 (both measured as described herein), and the starch is not pregelatinized. For example, in certain embodiments, the ratio (DP13-24−DP6-12)/(DP13-24+DP6-12) is no more than 27.5%, or even no more than 27.0% as measured by the drop-to-baseline method. In certain embodiments, the ratio (DP13-24−DP6-12)/(DP13-24+DP6-12) is 24.5%-28.0%, 24.5%-27.5%, 24.5%-27.0%, 25.0%-28.0%, 25.0%-27.5%, 25.0%-27.0%, 25.5%-28.0%, 25.5%-27.5%, 25.5%-27.0%, as measured by the drop-to-baseline method.

Another aspect of the disclosure is an inhibited waxy tapioca starch having an amylopectin content in the range of 90-100%; and a sedimentation volume in the range of 10-50 mL/g; in which the amylopectin fraction of the inhibited waxy tapioca has substantially more medium-length branches having a chain length from 13-24 than a native waxy rice starch, but substantially less medium-length branches having a chain length from 13-24 than a native waxy maize starch, and the starch is not pregelatinized. For example, in certain embodiments, the amylopectin fraction of the inhibited waxy tapioca starch has a DP13-24 value that is at least 2 percentage points greater than, at least 3 percentage points greater, or even at least 4 percentage points greater than the DP13-24 value for native waxy rice starch. And in certain embodiments, the amylopectin fraction of the inhibited waxy tapioca starch has a DP13-24 value that is at least 2 percentage points less than, or even at least 3 percentage points less than the DP13-24 value for native waxy maize starch. In certain such embodiments, the branch chain lengths are measured by the valley-to-valley method. In other such embodiments, the branch chain lengths are measured by the drop-to-baseline method.

DETAILED DESCRIPTION

Figure 1:
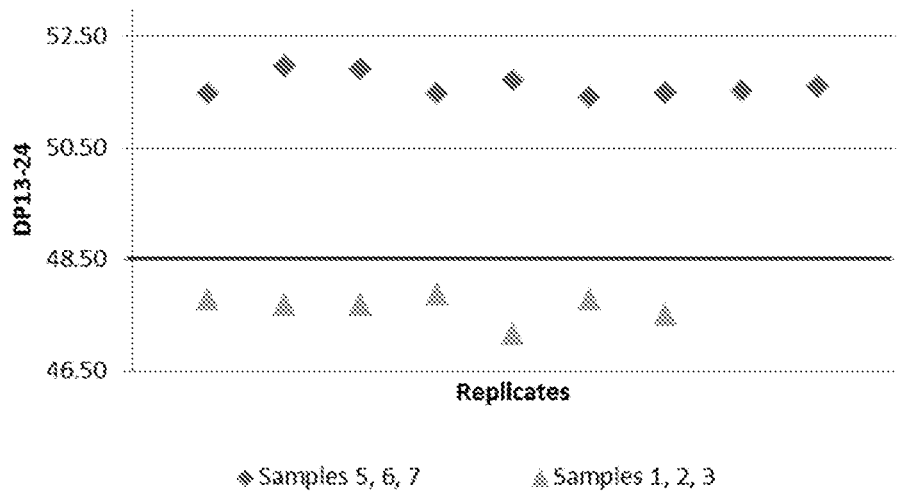
FIG. 1 is a graph of DP13-24 fraction for example starches of the disclosure as compared to conventional starches, as measured by the valley-to-valley method.

The present inventors have determined that starches having such characteristics (as well as, in some embodiments, other characteristics described herein) can be especially useful in that they are inhibited and have desirable stability characteristics, yet need not be labelled as "modified" starch. For example, the starches of the present disclosure can provide desirable freeze-thaw stability, desirable refrigerated storage stability, and/or desirable shelf stability.

The person of ordinary skill in the art will appreciate that various native starches have different relative amounts of the two major components of starch polysaccharides, amylose (a linear, alpha-1,4-linked polyglucoside) and amylopectin (a branched alpha-1,4-linked polyglucoside with alpha-1,6-linked branch points). So-called "waxy" starches have at least 90% amylopectin (i.e., of the total amount of amylose and amylopectin). Typical non-waxy starches have amounts of amylopectin in the range of 70-85%. In certain embodiments, the inhibited waxy starches based on maize, wheat, or tapioca as otherwise described herein have an amylopectin content in the range of 95-100%. In other embodiments, the inhibited waxy starch based on maize, wheat, or tapioca as otherwise described herein have an amylopectin content of at least 99%, or at least 99.9%. The high degree of amylopectin provides waxy starches with different properties than non-waxy starches, e.g., higher viscosity, formation of longer and more cohesive pastes, higher resistance to retrogradation.

In certain embodiments of the inhibited waxy starches based on maize, wheat, or tapioca as otherwise described herein, the inhibited waxy starch is a waxy tapioca starch (also known as a waxy cassava starch) In other embodiments of the inhibited waxy starches based on maize, wheat, or tapioca as otherwise described herein, the inhibited waxy starch is a waxy corn starch (i.e., a waxy maize starch). In other embodiments of the inhibited waxy starches based on maize, wheat, or tapioca as otherwise described herein, the inhibited waxy starch is a waxy wheat starch (i.e., a waxy wheat starch). The person of ordinary skill in the art will be able to distinguish different sources of starch, for example, via microscopy and comparison with standards. The person of ordinary skill in the art can, for example, view the starch materials under a microscope, optionally with dying with iodide, and use the size and the shape of the observed granules to determine the type of starch. As the person of ordinary skill in the art will appreciate, different types of starches from different sources can have different textures and rheological properties, and thus can be desirable for use in different food applications.

The inhibited waxy starches based on maize, wheat, or tapioca of the disclosure can have a variety of sedimentation volumes within the range of 10-50 mL/g. For example, in certain embodiments, an inhibited waxy starch based on maize, wheat, or tapioca as otherwise disclosed herein has a sedimentation volume in the range of 15-40 mug. In other embodiments, an inhibited waxy starch based on maize, wheat, or tapioca as otherwise disclosed herein has a sedimentation volume in the range of 18-35 mug. In various additional embodiments, an inhibited waxy starch based on maize, wheat, or tapioca as otherwise disclosed herein has a sedimentation volume in the range of 10-40 mL/g, or 10-35 mL/g, or 15-50 mL/g, or 15-35 mL/g, or 18-50 mL/g, or 18-40 mug. In still other embodiments, an inhibited waxy starch based on maize, wheat, or tapioca as otherwise disclosed herein has a sedimentation volume in the range of 10-45 mL/g, or 10-30 mL/g, or 10-25 mL/g, or 10-20 mL/g, or 15-45 mL/g, or 15-30 mL/g, or 15-25 mL/g, or 15-20 mL/g, or 20-50 mL/g, or 20-45 mL/g, or 20-40 mL/g, or 20-35 mL/g, or 20-30 mL/g, or 20-25 mL/g, or 25-50 mL/g, or 25-45 mL/g, or 25-40 mL/g, or 25-35 mL/g, or 25-30 mL/g, or 30-50 mL/g, or 30-45 mL/g, or 30-40 mL/g, or 30-35 mL/g, or 35-50 mL/g, or 35-45 mL/g, or 35-40 mL/g, or 40-50 mL/g. The person of ordinary skill in the art will appreciate that the sedimentation volume is a measure of the degree of inhibition of the starch, and will select a desired range of sedimentation volumes for a particular end use for the inhibited waxy starches based on maize, wheat, or tapioca described herein.

As used herein, sedimentation volume is the volume occupied by one gram of cooked starch (dry basis) in 100 grams (i.e. total, including the starch) of salted buffer solution. This value is also known in the art as "swelling volume." As used herein, the "salted buffer solution" refers to a solution prepared according to the following steps:
  a) Using a top loader balance, weigh out 20 grams of sodium chloride into a 2 liter volumetric flask containing a stir bar;
  b) To this add RVA pH 6.5 buffer (purchased from Ricca Chemical Company) so that the flask is at least half full;
  c) Stir to mix until sodium chloride is dissolved;
  d) Add additional RVA pH 6.5 buffer to a final volume of 2 liters:

Sedimentation volumes as described herein are determined by first cooking the starch at 5% solids in the salted buffer solution by suspending a container containing the slurry in a 95° C. water bath and stirring with a glass rod or metal spatula for 6 minutes, then covering the container and allowing the paste to remain at 95° C. for an additional 20 minutes. The container is removed from the bath and allowed to cool on the bench. The resulting paste is brought back to the initial weight by addition of water (i.e. to replace any evaporated water) and mixed well. 20.0 g of the paste (which contains 1.0 g starch) is weighted into a 100 mL graduated cylinder containing salted buffer solution, and the total weight of the mixture in the cylinder is brought to 100 g using the buffer. The cylinder is allowed to sit undisturbed for 24 hours. The volume occupied by the starch sediment (i.e., as read in the cylinder) is the sedimentation volume for 1 g of starch, i.e., in units of mL/g.

The present inventors have determined that inhibited waxy starch based on maize, wheat, or tapioca having certain branch chain length distributions can provide especially desirable properties. Accordingly, in certain inhibited waxy starches based on maize, wheat, or tapioca of the disclosure, the amylopectin fraction has less than 48.5% medium-length branches having a chain length from 13-24, and/or at least 28% short-length branches having chain length 6-12, and/or a ratio (DP13-24−DP6-12)/(DP13-24+DP6-12) less than 25.5%, all measured using the valley-to-valley method described herein.

The present inventors have also determined that inhibited waxy starch based on maize, wheat, or tapioca having certain branch chain length distributions can provide especially desirable properties. Accordingly, in certain inhibited waxy starches based on maize, wheat, or tapioca of the disclosure, the amylopectin fraction has less than 54.5% medium-length branches having a chain length from 13-24, and/or at least 30.5% short-length branches having chain length 6-12, and/or a ratio (DP13-24−DP6-12)/(DP13-24+DP6-12) less than 28.0%, all measured using the drop-to-baseline method described herein.

The present inventors have also determined that inhibited waxy starches based on tapioca having certain branch chain length distributions can provide especially desirable properties. Accordingly, in certain inhibited waxy tapioca starches of the disclosure, the amylopectin fraction has substantially more medium-length branches having a chain length from 13-24 than native waxy rice starch, but substantially less medium-length branches having a chain length from 13-24 than native waxy maize starch. As used herein, a "native waxy maize starch" is a starch that is derived from the endosperm of a waxy maize plant that does not contain a recessive sugary-2 ($su_2$) allele, as described in U.S. Pat. No. 5,954,883, which is hereby incorporated herein by reference in its entirety. As used herein, a native waxy rice starch is a native waxy rice starch from a waxy rice cultivar, such as Taichung Waxy 1, Taichung Waxy 70, Tachimemochi and Tainung Sen Waxy 2. In certain embodiments the DP13-24 value for an inhibited waxy tapioca starch of the disclosure is at least 2 percentage points greater, at least 3 percentage points greater, or even at least 4 percentage points greater than the DP13-24 value for native waxy rice starch. In certain embodiments, the DP13-24 value for an inhibited waxy tapioca starch of the disclosure is at least 2 percentage points less or even at least 3 percentage points less than the DP13-24 value for native waxy maize starch. Comparing DP13-24 values for the inhibited waxy tapioca starches of the disclosure with DP13-24 values for comparative waxy rice and maize starches provides an alternative method for identifying certain desirable starches. Notably, certain measurement artifacts can be controlled for when performing such a comparison. In certain such embodiments, the chain lengths are determined by the valley-to-valley method described herein. In other such embodiments, the chain lengths are determined by the drop-to-baseline method described herein.

Such starches can have a non-cohesive, smooth texture when cooked out or gelatinized, and can exhibit tolerance to processing conditions (such as heat, shear, and/or extremes of pH) as well as rheological and textural stability over a desired shelf life, even under refrigerated and/or freeze/thaw conditions.

In the valley-to-valley method, branch chain length of an amylopectin fraction is measured by first exhaustively debranching the amylopectin using isoamylase (EC 3.2.1.68, from *Pseudomonas* sp. having an isoamylase activity on oyster glycogen of 240 U/mg, alpha amylase activity on reduced maltoheptose of less than 0.001 U/mg, maltase activity on maltose less than 0.001 U/mg, and exo-alpha-glucanase activity on linear alpha-1,4-maltodextrins less than 0.000001 U/mg) at pH 4.0 and 45° C. for 16 hours.

Fresh 100 mM pH 4.0 acetate solution (i.e., having been stored at 4° C. for no more than 5 days) is used in the debranching. Isoamylase can be purchased from Megazyme (Wicklow, Ireland). Specifically, the debranching is performed as follows:
1. Weigh 10 mg waxy starch into the bottom of a glass test tube (Fisher, #14-962-26G). Add 3 mL Milli-Q water and cap the test tube. Prepare duplicate samples.
2. Heat the test tubes with samples in boiling water for 1 h with interval swirling.
3. Cool the test tubes to room temperature. Add 2 mL pH 4.0 acetate buffer solution, mix well.
4. Add 10 μL isoamylase (5U), a star-shaped stir bar into each test tube, mix well and cap.
5. Incubate samples in 45° C. heating block with constant stirring for at least 16 hours.
6. Heat samples at 100° C. for 30 minutes to inactivate the enzyme.
7. Cool samples to 40° C., filter through 0.45 μm Nylon syringe filters into Autosampler vials.

Characterization of the debranched waxy starches is performed by HPAE-PAD (High-Performance. Anion-Exchange Chromatography with Pulsed Amperometric Detection) on a Dionex ICS-3000 (Dionex, Sunnyvale, Calif.). A Dionex CarboPac PA1 analytical column (4×250 mm) is used with a CarboPac PA2 guard column (4×50 mm). The eluents used for separation are 150 mM NaOH (Eluent A), and 150 mM NaOH containing 500 mM NaOAc (Eluent B), prepared in degassed 18 MΩ·cm water and then filtered through a 0.2 μm membrane filter. The gradient programs for separation is as follows: 0-5 min 60% A, 5-20 min 60% to 40% A, 20 to 50 min 40% to 20% A, and 50 to 55 min 20% A. As the person of ordinary skill in the art will appreciate, "60% A" denotes an eluent mixture of 60% Eluent A and 40% Eluent B. The injection volume of sample solution is 10 μL. Each run was carried out at 30° C. with a flow rate of 1.2 mL/min. The working electrode is gold and the reference electrode is silver-silver chloride. The waveform is "Gold Standard PAD." The column is equilibrated and regenerated as follows: The system is equilibrated with 100% A for 30 min and then 60% A for at least 30 min before injection. Every five sample injections, the column is regenerated with 100% A for 30 min and then equilibrated with 60% A for 30 min, and then a 5 ppm DP1-7 mix standard solutions to check the retention times. Saccharide standards with degree of polymerization 1-7 can be purchased, e.g., from Sigma Aldrich.

To analyze the data in the valley-to-valley analytical method, peak area is calculated by integrating peaks by valley-to-valley. The chain length distribution is represented as a percentage of the total peak area from DP6 to DP53 and the detector response varying with DP is disregarded. The chain length distributions between DP6 and DP12 are summed up as "DP6-12"; the chain length distributions between DP13 and DP24 are summed up as "DP13-24". DP6-12 and DP13-24 of three replicates should have % RSD lower than 2%.

To analyze the data in the drop-to-baseline analytical method, a starch sample (20 mg, dry basis) is mixed with 10 mL of acetate buffer (0.01 M, pH 4) and subsequently cooked in a boiling water bath for 1 hr. After cooling to 50° C., gelatinized starch is debranched with an addition of 20 μL of isoamylase (Megazyme, Wicklow. Ireland). The starch debranching is allowed to proceed overnight (>12 hr), after which the enzyme is inactivated by heating the sample in a boiling water bath for 30 min. After cooling to room temperature, 1-1.5 mL of sample is passed through a 45 μm filter prior to injection into an AS-DV autosampler of HPAEC (Dionex ICS-3000, Dionex Corp., Sunnyvale, Calif.) equipped with a pulsed amperometric detector and a CarboPac™ PA1 analytical column. The sample is eluted with a gradient program of 40% of eluent B at 0 min, 50% at 2 min, 60% at 10 min, and 80% at 40 min, in which eluent A is 100 mM aqueous sodium hydroxide and eluent B is 150 mM aqueous sodium hydroxide containing 500 mM sodium acetate. The flow rate and the separation temperature are maintained throughout the measurement at 1 mL/min and 25° C., respectively. Peaks are integrated according to the baseline automatically created by Chromeleon™ version 6.8 (Thermo Fisher Scientific, Waltham, Mass.). The relative area % of each detectable DP, which refers to the area of each peak in the chromatogram as a percentage of the total area of all peaks, is computed by Chromeleon™. As above, the chain length distribution is represented as a percentage of the total peak area from DP6 to DP53 and the detector response varying with DP is disregarded. The chain length distributions between DP6 and DP12 are summed up as "DP6-12"; the chain length distributions between DP13 and DP24 are summed up as "DP13-24". Peaks are identified using standards from Sigma-Aldrich, St. Louis, Mo.

The person of ordinary skill in the art will appreciate that the branch chain length distribution of the amylopectin fraction of the waxy starch feedstock used to make an inhibited waxy starches based on maize, wheat, or tapioca can be substantially reflected in the branch chain length distribution of the amylopectin fraction of the inhibited waxy starches based on maize, wheat, or tapioca. In various methods for making the inhibited waxy starches based on maize, wheat, or tapioca described herein, the process conditions will not substantially change the branch chain length distribution of the amylopectin fraction. In certain embodiments, e.g., when using certain waxy tapioca starches as feedstocks, the waxy starch feedstock will have the desired distribution of medium-length branches as described above. However, in other embodiments, e.g., when using certain waxy maize or waxy wheat starches as feedstocks, the waxy starch feedstock can be treated to reduce the relative amount of medium-length branches having a chain length of 13-24 and/or to increase the relative amount of short-length branches having a chain length of 6-12. Such treatment can be performed, for example, using enzymatic methods.

The inhibited waxy starches based on maize, wheat, or tapioca described herein can be made with relatively little color. For example, certain embodiments of the inhibited waxy starches based on maize, wheat, or tapioca as otherwise described herein are relatively low in color, i.e., have a Yellowness Index of no more than 10, for example, in the range of 3-10 or 5-10. In certain desirable embodiments, the starches described herein are especially low in color, i.e., the Yellowness Index is less than 8 (e.g., 3-8 or 5-8). Yellowness Index is determined via ASTM E313.

Notably, the inhibited waxy starches based on maize, wheat, or tapioca described herein can be made without many of the conventional chemical modifiers used in making conventional modified and/or inhibited starches. Accordingly, in certain desirable embodiments, inhibited waxy starches based on maize, wheat, or tapioca as otherwise described herein can be marked or labelled as so-called "clean-label" starches. For example, in certain embodiments, an inhibited waxy starch based on maize, wheat, or tapioca as otherwise described herein is not hydroxypropylated. In certain embodiments, an inhibited waxy starch based on maize, wheat, or tapioca as otherwise described herein is not acetylated. In certain embodiments, an inhibited waxy starch based on maize, wheat, or tapioca as otherwise described herein is not carboxymethylated. In certain embodiments, an inhibited waxy starch based on maize, wheat, or tapioca as otherwise described herein is not hydroxyethylated. In certain embodiments, an inhibited waxy starch based on maize, wheat, or tapioca as otherwise described herein is not phosphated. In certain embodiments, an inhibited waxy starch based on maize, wheat, or tapioca as otherwise described herein is not succinated (e.g., not octenylsuccinated). In certain embodiments, an inhibited waxy starch based on maize, wheat, or tapioca as otherwise described herein is not cationic or zwitterionic.

Similarly, in certain embodiments the inhibited waxy starches based on maize, wheat, or tapioca described herein can be made without use of the cross-linkers typically used in the inhibition of starch. For example, in certain embodiments, an inhibited waxy starch based on maize, wheat, or tapioca as otherwise described herein is not crosslinked with phosphate (e.g., using phosphorus oxychloride or metaphosphate). In certain embodiments, an inhibited waxy starch based on maize, wheat, or tapioca as otherwise described herein is not crosslinked with adipate. In certain embodiments, an inhibited waxy starch based on maize, wheat, or tapioca as otherwise described herein is not crosslinked with epichlorohydrin. In certain embodiments, an inhibited waxy starch based on maize, wheat, or tapioca as otherwise described herein is not crosslinked with acrolein.

And the inhibited waxy starches based on maize, wheat, or tapioca of the disclosure (e.g., having the yellowness values described above) can in certain embodiments be made without using other harsh chemical treatments common in the art. For example, in certain embodiments, an inhibited waxy starch based on maize, wheat, or tapioca as otherwise described herein is not bleached or oxidized with peroxide or hypochlorite. Of course, in other embodiments, peroxide or hypochlorite can be used to provide even better color to the inhibited waxy starches based on maize, wheat, or tapioca described herein.

In certain embodiments, the inhibited waxy starches based on maize, wheat, or tapioca of the disclosure can be made without dextrinization, and as such do not contain substantial amounts of the repolymerized branched chains typical of dextrins. Accordingly, in such embodiments, an inhibited waxy starches based on maize, wheat, or tapioca as otherwise described herein substantially lacks 1,2- and 1,3- branching (e.g., less than 1% of each). Such branching can be determined using nuclear magnetic resonance techniques familiar to the person of ordinary skill in the art.

The inhibited waxy starches based on maize, wheat, or tapioca of the present disclosure can have a variety of viscosities as measured by a Rapid Visco Analyzer (RVA). For example, in certain embodiments an inhibited waxy starch based on maize, wheat, or tapioca as otherwise described herein can have a viscosity as measured by RVA is in the range of 50-1500 cP. In certain such embodiments, the viscosity as measured by RVA is in the range of 50-1000 cP, 50-850 cP, 50-700 cP, 50-500 cP, 50-400 cP, 50-300 cP, 50-200 cP, 100-1100 cP, 100-1000 cP, 100-850 cP, 100-700 cP, 100-500 cP, 100-400 cP, 100-300 cP, 200-1100 cP, 200-1000 cP, 200-850 cP, 200-700 cP, 200-500 cP, 400-1100 cP, 400-1000 cP, 400-850 cP, 400-700 cP, 600-1100 cP, or 600-850 cP, 700-1500 cP, or 700-1300 cP. The viscosity is measured by RVA at 5% solids in a pH 6.5 phosphate buffer at 1% NaCl at a stir rate of 160 rpm. The initial temperature of the analysis is 50° C.; the temperature is ramped linearly up to 90° C. over 3 minutes, then held at 95° C. for 20 minutes, then ramped linearly down to 50° C. over 3 minutes, then held at 50° C. for 9 minutes, after which time the viscosity is measured. Notably, when a pasting peak is displayed at times of about 2-5 minutes, the final viscosity measured is higher than the pasting peak viscosity. When the pasting peak is absent, the viscosity during the 95° C. hold is flat, or increases.

As noted above, the inhibited waxy starches based on maize, wheat, or tapioca of the disclosure are not pregelatinized.

In certain embodiments, the inhibited waxy starches based on maize, wheat, or tapioca of the disclosure substantially retain intact granules upon cooking. As used herein, granularity is determined by cooking the starch at 5% solids in the salted buffer solution by suspending a container containing the slurry in a 95° C. water bath and stirring with a glass rod or metal spatula for 6 minutes, then covering the container and allowing the paste to remain at 95° C. for an additional 20 minutes, then allowing the paste to cool to room temperature. Following such cooking, swollen but intact granules can be observed microscopically. The person of ordinary skill in the art would understand that minor deviations from granularity are allowed. For example, in certain embodiments of the inhibited waxy starches based on maize, wheat, or tapioca as otherwise described herein, no more than 30% of the starch granules become non-intact upon cooking (i.e. as described above with respect to granularity). In certain such embodiments, no more than 20% or even no more than 10% of the starch granules become non-intact upon cooking (i.e., as described above with respect to granularity). The person of ordinary skill in the art can determine whether starch granules remain intact by viewing them under a microscope (e.g., with staining), as is conventional in the art.

Certain desirable embodiments of the inhibited waxy starches based on maize, wheat, or tapioca as described herein are substantially digestible. For example, in certain embodiments of the inhibited waxy starches based on maize, wheat, or tapioca as otherwise described herein, the amount of fiber is less than 10% as determined by AOAC 2001.03. In certain such embodiments, the amount of fiber is less than 5% or even less than 2%.

As noted above, the starches of the disclosure are inhibited. As used herein, the term "inhibited starch" means a starch which exhibits "process tolerance". As used herein, the term "process tolerance" means that the starch particles swell in water when cooked, but substantially retain their particulate natural throughout the process. Process-tolerant starches resist breaking down into fragments and resist dissolution when processed. Inhibited starches may vary with respect to their degree-of-inhibition, as characterized by their observed microscopy and swelling volume. Degree-of-inhibition can be assessed by cooking the starch in water (typically cook at 95° C. for 30 mins with hand stirring in the first 6 mins) and then observing the cook under microscope. Starches that have not been inhibited will have few granules and fragments, as they tend to dissolve in water during cooking. Starches that have been inhibited will show swollen intact particles under microscope, with starches that have been highly inhibited exhibit small and dark particles and starches that have been slightly inhibited exhibit large and light particles. Alternatively, degree-of-inhibition can be assessed through the measurement of sedimentation volume of the starch as described above.

The inhibited waxy starches based on maize, wheat, or tapioca of the disclosure may be made using a variety of methodologies. A variety of waxy starch feedstocks can be used (e.g., a native starch such as a waxy tapioca starch or a waxy corn starch, or any of the other waxy starches described herein). The waxy starch feedstock can be pretreated, for example, to reduce the amount of lipid and/or protein present in the starch, as is conventional in the art.

In certain embodiments, the inhibited waxy starches based on maize, wheat, or tapioca of the present disclosure are made using the methods described in International Patent Application Publication no. WO 2013/173161, which is hereby incorporated herein by reference in its entirety. Thus, a method for making the starches described herein can include
  a) heating a non-pregelatinized granular waxy starch in an alcoholic medium in the presence of a base at a temperature of at least 35° C.;
  b) neutralizing the base with an acid;
  c) separating the inhibited granular waxy starch from the alcoholic medium; and
  d) removing alcohol solvent from the inhibited waxy granular starch, e.g., by heating or with steam.

The alcoholic medium generally comprises at least one alcohol, particularly a C1-C4 monoalcohol such as methanol, ethanol, n-propanol, isopropanol, n-butanol, t-butyl alcohol and the like. One or more other substances may also be present in the alcoholic medium, such as a non-alcoholic organic solvent (particularly those that are miscible with the alcohol) and/or water. However, in one embodiment of the method the alcoholic medium does not contain any solvent other than alcohol and, optionally, water. Aqueous alcohols, for example, may be used to advantage. The alcoholic medium may comprise, for instance. 30% to 100% by weight alcohol (e.g., ethanol) and from 0% to 70% by weight water. In one embodiment, the alcoholic medium contains from 80% to 96% by weight alcohol (e.g., ethanol) and from 4% to 20% by weight water, the total amount of alcohol and water equaling 100%. In another embodiment, the alcoholic medium contains 90% to 100% by weight alcohol (e.g., ethanol) and from 0% to 10% by weight water, the total amount of alcohol and water equaling 100%. In other embodiments, not more than 10% or not more than 15% by weight water is present in the alcoholic medium. The quantity of alcoholic medium relative to starch is not considered to be critical, but typically for the sake of convenience and ease of processing sufficient alcoholic medium is present to provide a stirrable and/or pumpable slurry. For example, the weight ratio of starch:alcoholic medium may be from about 1:2 to about 1:6.

In certain methods, at least some amount of treatment agent (base and/or salt) is present when the waxy starch feedstock is heated in the alcoholic medium. However, it is advantageous that large amounts of treatment agent (relative to starch) need not be used in order to achieve effective inhibition of the starch, in contrast to previously known starch modification processes. This simplifies the subsequent processing of the inhibited waxy starches based on maize, wheat, or tapioca and lowers potential production costs. Typically, at least 0.5% by weight of treatment agent (based on the dry weight of starch used) is employed, although in other embodiments at least 1%, at least 2%, at least 3%, at least 4% or at least 5% by weight of treatment agent is present. For economic reasons, generally no more than 10% or 15% by weight of treatment agent is present.

Typically, the mixture of starch, alcoholic medium and treatment agent is in the form of a slurry. In certain embodiments, it may be desirable to adjust the pH of the slurry to a particular value. It can be difficult to measure the pH of such a slurry due to the presence of the alcohol. In an embodiment where it is desired to make the slurry basic by adding a base, a suitable amount of base can be determined as if the slurry is a slurry of starch in deionized water alone and then scaled up to the actual amount while keeping the same ratio of base and starch.

The slurry may, for example, be neutral (pH 6 to 8) or basic (pH greater than 8). In one embodiment, the pH of the slurry is at least 6. In another embodiment, the pH of the slurry is at least 7. The slurry pH in another embodiment is not more than 12. In other embodiments, the pH of the slurry is 6-10, 7.5-10.5 or 8-10. In still other embodiments, the pH of the slurry is 5-8 or 6-7.

The alcohol-treatment agent treatment of the starch may be effected by first placing the starch in the alcoholic medium and then adding treatment agent (e.g., base and/or salt). Alternatively, the treatment agent may be first combined with the alcoholic medium and then contacted with the starch. The treatment agent may be formed in situ, such as by separately adding a base and an acid which react to form the salt which functions as the treatment agent.

Suitable bases for use in the process include, but are not limited to, alkali metal and alkaline earth metal hydroxides such as potassium hydroxide, calcium hydroxide and sodium hydroxide.

Suitable salts for use in these methods include water-soluble substances which ionize in aqueous solution to provide a substantially neutral solution (i.e., a solution having a pH of from 6 to 8). Alkali metal-containing salts are particularly useful, as are salts of organic acids (e.g., a sodium or potassium salt) such as itaconic acid, malonic acid, lactic acid, tartaric acid, citric acid, oxalic acid, fumaric acid, aconitic acid, succinic acid, oxalosuccinic acid, glutaric acid, ketoglutaric acid, malic acid, fatty acids and combinations thereof.

Mixtures of different treatment agents may be used. For example, the starch may be heated in the alcoholic medium in the presence of both at least one base and at least one salt.

The starch, alcoholic medium and treatment agent are heated for a time and at a temperature effective to inhibit the starch to the desired extent. Generally speaking, temperatures in excess of room temperature (i.e., 35° C. or greater) will be necessary. At the same time, extremely high temperatures should be avoided. The heating temperature can be, for example, 35° C. to 200° C. Typically, temperatures of from 100° C. to 190° C., 120° C. to 180° C., or from 130° C. to 160° C., or from 140° C. to 150° C. will be sufficient. The heating time generally is at least 5 minutes but no more than 20 hours and typically 40 minutes to 2 hours. In general, a desired level of starch inhibition may be achieved more rapidly if the heating temperature is increased.

The specific conditions of time of treatment, temperature of treatment, and proportions of the components of the mixture of starch, alcoholic medium and treatment agent are generally selected such that the starch is not gelatinized to a significant extent. That is, the starch remains non-pregelatinized as described above.

When the temperature selected for the heating step exceeds the boiling point of one or more components of the alcoholic medium, it will be advantageous to carry out the heating step in a vessel or other apparatus capable of being pressurized. The treatment may be conducted within a confined zone in order to maintain the alcoholic medium in a liquid state. Additional positive pressure could be employed, but is generally not necessary. The starch may be slurried in the alcoholic medium together with the treatment agent under conditions of elevated temperature and pressure and treated for a time sufficient to change the starch's viscosity characteristics. Such treatment may be conducted in a stirred tank reactor on a batch basis or in a tubular reactor on a continuous basis, although other suitable processing techniques will be apparent to those skilled in the art. In another embodiment, the starch may be in the form of a bed within a tubular reactor and a mixture of the alcoholic medium and treatment agent passed through such bed (optionally, on a continuous basis), with the bed being maintained at the desired temperature to effect inhibition of the starch.

In embodiments in which a base has been utilized as a treatment agent, the mixture of starch, alcoholic medium and base may be combined with one or more acids, once the heating step is completed, for the purpose of neutralizing the base. Suitable acids for use in such neutralization step include, but are not limited to, carboxylic acids such as itaconic acid, malonic acid, lactic acid, tartaric acid, oxalic acid, fumaric acid, aconitic acid, succinic acid, oxalosuccinic acid, glutaric acid, ketoglutaric acid, malic acid, citric acid, fatty acids and combinations thereof, as well as other types of acids such as uric acid. If the inhibited starch is intended for use as a food ingredient, the acid generally should be selected to be one that is permitted for such use under applicable regulations. Typically, sufficient acid is added to lower the pH of the mixture to about neutral or slightly acidic, e.g., a pH of from about 5 to about 7 or from about 6 to about 6.5.

The neutralization with acid may be carried out at any suitable temperature. In one embodiment, the slurry of starch, base and alcoholic medium is cooled from the heating temperature used to approximately room temperature (e.g., about 15° C. to about 30° C.) prior to being combined with the acid to be used for neutralization. The neutralized mixture may thereafter be further processed as described below to separate the inhibited starch from the alcoholic medium. In another embodiment, however, neutralization of the base is followed by further heating of the starch slurry. Such further heating has been found to be capable of modifying the rheological properties of the inhibited starch obtained, as compared to the viscosity characteristics of an analogously prepared starch that has not been subjected to heating after neutralization of the base.

Generally speaking, such further heating step is advantageously carried out at temperatures in excess of room temperature (i.e., 35° C. or greater). At the same time, extremely high temperatures should be avoided. The heating temperature can be, for example, 35° C. to 200° C. Typically, temperatures of from 100° C. to 190° C., 120° C. to 180° C., or from 130° C. to 160° C., or from 140° C. to 150° C. will be sufficient. The heating time generally is at least 5 minutes but no more than 20 hours and typically 40 minutes to 2 hours.

The mixture of starch and alcoholic medium may be processed so as to separate the starch from the alcoholic medium. Conventional methods for recovering particulate solids from liquids such as filtration, decantation, sedimentation or centrifugation may be adapted for such purpose. The separated starch may optionally be washed with additional alcoholic medium and/or alcohol and/or water to remove any undesired soluble impurities. In one embodiment, neutralization of residual base is accomplished by washing the recovered starch with an acidified liquid medium. Drying of the separated starch will provide an inhibited non-pregelatinized granular starch in accordance with the disclosure. For example, drying may be performed at a moderately elevated temperature (e.g., 30° C. to 60° C.) in a suitable apparatus such as an oven or a fluidized bed reactor or drier or mixer. Vacuum and/or a gas purge (e.g., a nitrogen sweep) may be applied to facilitate removal of volatile substances (e.g., water, alcohol) from the starch. The resulting dried inhibited non-pregelatinized granular starch may be crushed, ground, milled, screened, sieved or subjected to any other such technique to attain a particular desired particle size. In one embodiment, the inhibited starch is in the form of a free-flowing, granular material.

In one embodiment, however, the starch is subjected to a desolventization step at a significantly higher temperature (e.g., greater than 80° C. or greater than 100° C. or greater than 120° C.). Excessively high temperatures should be avoided, however, since degradation or discoloration of the starch may result. Such a step not only reduces the amount of residual solvent (alcohol) in the product but also provides the additional unexpected benefit of enhancing the degree of inhibition exhibited by the starch. Desolventization temperatures can, for example, be about 100° C. to about 200° C. Typical temperatures are 120° C. to 180° C. or 150° C. to 170° C. The desolventization may be carried out in the presence or in the absence of steam. Steam treatment has been found to be advantageous in that it helps to minimize the extent of starch discoloration which may otherwise occur at such an elevated temperature. In one embodiment, steam is passed through a bed or cake of the inhibited waxy starches based on maize, wheat, or tapioca. The starch desolventization methods of U.S. Pat. No. 3,578,498, incorporated herein by reference in its entirety for all purposes, may be adapted for use. Following steam treatment, the inhibited waxy starches based on maize, wheat, or tapioca may be dried to reduce the residual moisture content (e.g., by heating in an oven at a temperature of from about 30° C. to about 70° C. or in a fluidized bed reactor).

In one embodiment, the treated starch, which has been recovered from the alcoholic medium, is first brought to a total volatiles content of not more than about 35% by weight or not more than about 15% by weight. This can be accomplished, for example, by first air or oven drying the recovered starch at moderate temperature (e.g., 20° C. to 70° C.) to the desired initial volatiles content. Live steam is then passed through the dried starch, the system being maintained at a temperature above the condensation point of the steam. A fluid bed apparatus may be used to perform such a steam desolventization step.

In general, it will be desirable to carry out desolventization under conditions effective to result in a residual alcohol content in the inhibited waxy starches based on maize, wheat, or tapioca of less than 1 weight % or less than 0.5 weight % or less than 0.1 weight %.

Following desolventization, the inhibited waxy starches based on maize, wheat, or tapioca may be washed with water and then re-dried to further improve color and/or flavor and/or reduce the moisture content.

Of course, the person of ordinary skill in the art can use other methodologies to arrive at the starches described herein. The waxy starch feedstock can, for example, be subjected to a pH adjustment and heated. The pH adjustment can be performed by contacting a pH-adjusting agent with the starch; examples of pH-adjusting agents include formic acid, propionic acid, butyric acid, oxalic acid, lactic acid, malic acid, citric acid, fumaric acid, succinic acid, glutaric acid, malonic acid, tartaric acid, itaconic acid, aconitic acid, oxalosuccinic acid, ketoglutaric acid, fatty acids, and carbonic acid, as well as salts thereof (e.g., potassium and/or sodium salts, which can be generated in situ by neutralization of the acid). The pH-adjusting agent can be contacted with the starch feedstock in any convenient fashion, e.g., as a slurry in liquid (e.g., water, alcohol (e.g., as described above, including ethanol or isopropanol), including aqueous alcohol such as aqueous ethanol, or another solvent); in dry form; in damp form (e.g., in a mist in a solvent (such as water, aqueous ethanol, or another solvent); or in the form of a damp dough of the starch (e.g., with water, aqueous ethanol, or another solvent). And when an alkali metal salt of an acid is to be used, it can be formed in situ, e.g., by adding the acid and an alkali metal hydroxide or carbonate in separate steps.

The pH adjustment can be performed to yield a variety of pH values. For example, in certain embodiments, and as described in WO 2013/173161, the pH adjustment can be performed to yield a pH in the range of 7-10. In other, alternative embodiments, the pH adjustment can be performed to yield a pH in the range of 3-7, e.g., in the range of 3-6, or 3-5, or 3-4, or 4-7, or 4-6, or 4.5-7, or 4.5-6, or 5-7, or 5-6, or about 3, or about 3.5, or about 4, or about 4.5, or about 5, or about 5.5, or about 6, or about 6.5, or about 7. When the pH adjustment is performed in a slurry, the pH of the slurry is the relevant pH. When the pH adjustment is performed in a substantially non-liquid form (e.g., a dough, or in damp solid), the pH of the solid material at 38% in water is the relevant pH. The amount of the pH-adjusting agent relative to the starch can vary, for example, from 0.05-30 wt % on a dry solids basis, e.g., 0.05-20 wt %, 0.05-10 wt %, 0.05-5 wt %, 0.05-2 wt %, 0.05-1 wt %, 0.05-0.5 wt %, 0.2-30 wt %, 0.2-20 wt %, 0.2-10 wt %, 0.2-5 wt %, 0.2-2 wt %, 0.2-1 wt %, 1-30 wt %, 1-20 wt %. 1-10 wt %, 1-5 wt %. 5-30 wt % or 5-20 wt %. Desirably, the pH adjusting agent is mixed thoroughly with the starch feedstock. This will require different process conditions depending on the form in which the pH adjustment is performed. If the pH adjustment is performed in a slurry, simply stirring the slurry for a few minutes may be sufficient. If the pH adjustment is performed in a drier form (e.g., in a damp solid or a dough), more substantial contacting procedures may be desirable. For example, if a solution of the pH-adjusting agent is sprayed onto dry starch feedstock, it can be desirable to mix for about 30 minutes then store for at least a few hours. It is desirable to provide for uniform distribution of the pH-adjusting agent throughout the starch, i.e., on a granular level, in order to provide uniform inhibition.

After the pH-adjusting agent is contacted with the starch, the starch can be heated (i.e. while still in contact with pH-adjusting agent). The starch can be heated in a variety of forms. For example, the starch can be heated in alcohol or non-aqueous solvent slurry (e.g., under pressure if the boiling point of the solvent not sufficiently above the heating temperature); as a dough of starch, water, and non-water solvent to suppress granular swelling (e.g., as disclosed in WO 2013/173161), or in a dry state (solvent can be removed using conventional techniques such as filtration, centrifugation and/or heat-drying, e.g. as described above with respect WO 2013/173161). The starch can be, for example, dried to a moisture level of less than 5% before further heating. Relatively low temperatures, e.g., 40-80° C., or 40-60° C., or about 50° C., can be used for such drying. Vacuum can also be used in the drying process. The starch can be dried as a result of the heating process (see below); a separate drying step is not necessary.

The dried starch can be heated at a temperature in the range of 100–200° C. For example, in certain methods, the heating temperature is 120-160° C. In other various methods, the heating temperature is 120-180° C., or 120-160° C., or 120-140° C., or 140-200° C., or 140-180° C., or 140-160° C., or 160-200° C., or 160-180° C., or 180-200° C. The starch can be heated for a variety of times. The starch can be heated for a time in the range of, for example, 20 seconds to 20 hours. Typical heating times are in the range of 10 minutes to two hours. Longer heating times and/or higher heat-treatment temperatures can be used to provide more inhibition. The material is desirably uniformly heated. The starch can be heated under pressure to maintain a desired moisture content, or it can be heated in a mass flow bin or similar device.

Certain methods described herein can be practiced, for example, using no alcohol in the liquid medium for the contacting with the pH adjustment. In certain particularly desirable methods, water is used as the medium for the pH adjustment. Accordingly, in certain desirable embodiments, the inhibited waxy starch based on maize, wheat, or tapioca comprises less than 500 ppm of alcohol solvent, e.g., less than 500 ppm ethanol. For example, in various embodiments, the inhibited waxy starch based on maize, wheat, or tapioca comprises less than 100 ppm, less than 50 ppm, less than 10 ppm, less than 5 ppm, or less than 1 ppm of alcohol solvent, e.g., less than 100 ppm, less than 50 ppm, less than 10 ppm, less than 5 ppm, or less than 1 ppm ethanol.

The heated starch can be allowed to cool then used as-is, or further treated as is conventional in the art. For example, the starch can be washed to provide even whiter color and more pleasant flavor. If a non-aqueous solvent is used, it can be desirable to remove as much solvent as possible. But if relatively low levels of the pH-adjusting agent are used, the final product can meet reasonable pH and ash targets without further washing.

As the person of ordinary skill in the art will appreciate, the starch feedstock may be purified, e.g., by conventional methods, to reduce undesirable flavors, odors, or colors, e.g., that are native to the starch or are otherwise present. For example, methods such as washing (e.g., alkali washing), steam stripping, ion exchange processes, dialysis, filtration, bleaching such as by chlorites, enzyme modification (e.g., to remove proteins), and/or centrifugation can be used to reduce impurities. The person of ordinary skill in the art will appreciate that such purification operations may be performed at a variety of appropriate points in the process.

Another aspect of the disclosure is a pregelatinized starch made by a method comprising gelatinizing and drying an inhibited waxy starch based on maize, wheat or tapioca as described herein (i.e., in the substantial absence of other food ingredients, in order to provide a material that is at least 95 wt % or even at least 99 wt % on a dry solids basis pregelatinized starch). The person of ordinary skill in the art will use conventional pregelatinization methods.

The starches described herein can be used as thickeners or viscosifiers, e.g., to increase the viscosity of a fluid or semisolid composition. One problem with conventional starches is that upon storage, e.g., long periods of storage, upon storage at cool temperatures, or upon undergoing freeze/thaw cycles, the starch can become dehydrated as a result of intermolecular association and irreversibly lose water through a process known as syneresis. This can markedly deteriorate the texture and clarity of the food product. Advantageously, when a food product containing a starch of the present disclosure is cooked and cooled to the desired storage temperature, it can maintain its textural attributes for a long time throughout its shelf life and withstand the temperature fluctuations (e.g. freeze-thaw cycle) during storage. Thus, the food products that include a starch as described herein can be substantially freeze-thaw stable, substantially stable to refrigeration, and/or substantially stable to storage. In certain embodiments as otherwise described herein, the inhibited waxy starch has one or more of 1) a graininess of 4 or less after three freeze-thaw cycles, 2) a syneresis of 5 or less, or even 3 or less after three freeze-thaw cycles, and 3) a change in firmness of no more than 2 after three freeze-thaw cycles. All such properties are measured as described in the Examples below.

Accordingly, another aspect of the disclosure is a method for making a food product. The method includes cooking a starch as described herein the presence of water; and providing the cooked starch in combination with one or more other food ingredients. For example, a starch as described herein can be combined with one or more other food ingredients that include water, and cooking the combination of the starch and the food ingredients. In particular embodiments, the method includes pasteurization, retorting, kettle or batch cooking, or ultra-high temperature processing. The starch can alternatively be cooked separately, and later combined with one or more of the food ingredients.

The food product can be, for example, a tomato-based product, a gravy, a sauce such as a white sauce or a cheese sauce, a soup, a pudding, a salad dressing (e.g., pourable or spoonable), a yogurt, a sour cream, a pudding, a custard, a cheese product, a fruit filling or topping, a cream filling or topping, a syrup (e.g., a lite syrup), a beverage (e.g., a dairy-based beverage), a glaze, a condiment, a confectionary, a pasta, a frozen food, a cereal, or a soup. A variety of cooking methods can be used, for example, pasteurization, retorting, kettle cooking, batch cooking and ultra-high temperature processing.

The starches described herein can also be used to modify the properties of solid foods, e.g., baked goods, for example, acting as an anti-stalant to provide a softer product that retains a fresher texture after storage. Accordingly, in other embodiments, the food product is a baked good, e.g., a bread, a pastry, a pie crust, a donut, a cake, a biscuit, a cookie, a cracker, or a muffin. In such embodiments, the cooking can include baking. In some embodiments, the use of the starches described herein in a baked good (i.e., in the dough or batter thereof) can help reduce staling. In other embodiments, the starch can be included in, e.g., a filling inside the baked good.

A variety of other food products can advantageously be made using the starches of the present disclosure. For example, food products in which the starches of the present disclosure are useful include thermally-processed foods, acid foods, dry mixes, refrigerated foods, frozen foods, extruded foods, oven-prepared foods, stove top-cooked foods, microwaveable foods, full-fat or fat-reduced foods, and foods having a low water activity. Food products in which the starches of the present disclosure are particularly useful are foods requiring a thermal processing step such as pasteurization, retorting, high-temperature short-time treatment, or ultra high temperature (UHT) processing. The starches of the present disclosure are particularly useful in food applications where stability is required through all processing temperatures including cooling, freezing and heating.

Based on processed food formulations, the practitioner may readily select the amount and type of the starches of the present disclosure required to provide the necessary thickness and gelling viscosity in the finished food product, as well as the desired texture. Typically, the starch is used in an amount of 0.1-35%, e.g., 0.5-6.0%, by weight, of the food product.

Among the food products which may be improved by the use of the starches of the present disclosure are high acid foods (pH<3.7) such as fruit-based pie fillings, baby foods, and the like; acid foods (pH 3.7-4.5) such as tomato-based products; low acid foods (pH>4.5) such as gravies, sauces, and soups; stove top-cooked foods such as sauces, gravies, and puddings; instant foods such as puddings; pourable and spoonable salad dressings; refrigerated foods such as dairy or imitation dairy products (e.g., yogurt, sour cream, and cheese); frozen foods such as frozen desserts and dinners; microwaveable foods such as frozen dinners; liquid products such as diet products and hospital foods; dry mixes for preparing baked goods, gravies, sauces, puddings, baby foods, hot cereals, and the like; and dry mixes for predusting foods prior to batter cooking and frying.

In other embodiments, the food product is a confection. The starches described herein can be used in a wide variety of other foods. For example, in certain embodiments of the starches and methods of the disclosure, the starch is used in a food selected from baked foods, breakfast cereal, anhydrous coatings (e.g., ice cream compound coating, chocolate), dairy products, confections, jams and jellies, beverages, fillings, extruded and sheeted snacks, gelatin desserts, snack bars, cheese and cheese sauces, edible and water-soluble films, soups, syrups, sauces, dressings, creamers, icings, frostings, glazes, tortillas, meat and fish, dried fruit, infant and toddler food, and batters and breadings. The starches described herein can also be used in various medical foods. The starches described herein can also be used in pet foods.

The starches of the present disclosure may also be used in various non-food end use applications where chemically modified (crosslinked) inhibited starches have conventionally been utilized, such as cosmetic and personal care products, paper, packaging, pharmaceutical formulations, adhesives, and the like.

Desirably, the starches of the disclosure can provide superior properties, such as freeze-thaw stability, in combination with good digestive tolerance. The present inventors have determined that the starches described herein, unlike many highly modified starches, can be inhibited sufficiently to provide desirable properties, such as desirable viscosity properties and desirable freeze-thaw tolerance, even in demanding storage conditions, without becoming indigestible or without otherwise causing digestive intolerance.

For example, in certain desirable embodiments as otherwise described herein, the starches of the disclosure have one or more of (e.g., two or more of, or all three of):

a) a desirable viscosity, e.g., a viscosity as measured by RVA in the range of 50-1500 cP. In certain such embodiments, the viscosity as measured by RVA is in the range of 50-1000 cP, 50-850 cP, 50-700 cP, 50-500 cP, 50-400 cP, 50-300 cP, 50-200 cP, 100-1100 cP, 100-1000 cP, 100-850 cP, 100-700 cP, 100-500 cP, 100-400 cP, 100-300 cP, 200-1100 cP, 200-1000 cP, 200-850 cP, 200-700 cP, 200-500 cP, 400-1100 cP, 400-1000 cP, 400-850 cP, 400-700 cP, 600-1100 cP, or 600-850 cP, 700-1500 cP, or 700-1300 cP;

b) desirable freeze-thaw behavior, e.g., one or more of 1) a graininess of 4 or less after three freeze-thaw cycles, 2) a syneresis of 5 or less, or even 3 or less after three freeze-thaw cycles, and 3) a change in firmness of no more than 2 units after three freeze-thaw cycles; and c) good digestive tolerance.

Another aspect of the disclosure is a dry mix comprising a starch as described herein, in admixture with one or more food ingredients. When the dry mix is cooked (i.e. in the presence of water), it can take a longer time to gel, and thus allow for longer times to hold cooked product, to convey cooked product (e.g., by pumping), and to fill cooked product into containers before the product sets to gel. The dry mix can be, for example, a dry mix for a baked good, e.g., a bread, a pastry, a pie crust, a donut, a cake, a biscuit, a cookie, a cracker, or a muffin.

Further description is provided with respect to the Examples, below.

Example 1—Viscosity and Sedimentation Volume of Inhibited Waxy Starches

The waxy starch feedstock is subjected to a pH adjustment using one of the following pH-adjusting agents: formic acid, propionic acid, butyric acid, oxalic acid, lactic acid, malic acid, citric acid, fumaric acid, succinic acid, glutaric acid, malonic acid, tartaric acid, itaconic acid, aconitic acid, oxalosuccinic acid, ketoglutaric acid, and carbonic acid, as well as salts thereof (e.g., potassium and/or sodium salts, which can be generated in situ by neutralization of the acid). The pH-adjusting agent is contacted with the starch feedstock in slurry in liquid (e.g., water) under stirring for a few minutes. The pH adjustment can be done in the range of pH from 3.5 to 7.0. The amount of the pH-adjusting agent relative to the starch can vary, for example, from 0.01-30 wt % on a dry solids basis weight of starch. After the pH-adjusting agent is contacted with the starch, the starch (i.e. while still in contact with pH-adjusting agent) is dried to a moisture level of less than 1% before further heating, and the dried starch is heated at a temperature in the range of 100-200° C. for a time in the range of, for example, 20 seconds to 20 hours.

Both native waxy maize starch and native waxy tapioca starch have amylopectin content higher than 90% according to information provided by suppliers. Sedimentation volume and RVA viscosity data of both native and inhibited waxy starches are provided in Table 1, below. Samples 1-4 were prepared by using native waxy tapioca starch as starting material, while samples 5-7 were prepared by using native waxy maize starch as starting material. The range in sedimentation volumes of highest interest for food applications is typically considered to be 20-35 mL/g.

TABLE 1

RVA final viscosity and sedimentation volumes (SV) for experimental samples

| Sample # | SV, mL/g | RVA viscosity, cP |
|---|---|---|
| Native waxy tapioca starch | 100 | 695 |
| 1 | 21 | 190 |
| 2 | 26 | 964 |
| 3 | 31 | 1399 |
| 4 | 41 | 1380 |
| Native waxy maize starch | 100 | 475 |
| 5 | 30 | 943 |
| 6 | 26 | 731 |
| 7 | 21.5 | 198 |

The viscosity is measured by RVA at 5% solids in a salted buffer solution at a stir rate of 160 rpm. The initial temperature of the analysis is 50° C.; the temperature is ramped linearly up to 90° C. over 3 minutes, then held at 95° C. for 20 minutes, then ramped linearly down to 50° C. over 3 minutes, then held at 50° C. for 9 minutes. The viscosity was measured throughout the heating and cooling cycle, and viscosity at the end of cycle was reported as RVA viscosity. In contrast to native waxy starches, samples 1-7 do not have a big peak at the beginning of the RVA curve, and hold stable viscosity at high temperature.

Example 2 Branch Chain Length Distribution Analysis—Valley-to-Valley Method

Figure 2:
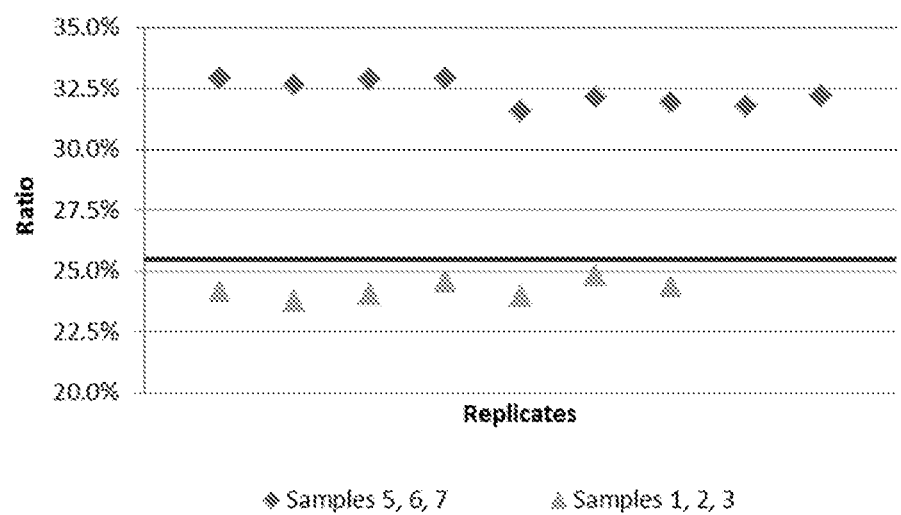
FIG. 2 is a graph of the ratio (DP13-24−DP6-12)/(DP13-24+DP6-12) for example starches of the disclosure as compared to conventional starches, as measured by the valley-to-valley method.

Branch chain length distributions were determined as described above for native or inhibited waxy starches described herein, using the valley-to-valley method. The results are shown in FIGS. 1 and 2, which indicates that the inhibited waxy tapioca starches of the disclosure have an amylopectin fraction with DP13-24 of no more than 48.0%, while other inhibited starches have the amylopectin fraction with DP13-24 in excess of 48.5%; and that the inhibited waxy tapioca starches of the disclosure have a ratio (DP13-24−DP6-12)/(DP13-24+DP6-12) less than 25.0%, while other inhibited starches have a ratio (DP13-24−DP6-12)/(DP13-24+DP6-12) greater than 25.5%. Detailed data are provided in the table below, in which replicates for each material are provided.

TABLE 2

Valley-to-Valley branch chain length profiles of native and inhibited starches

| Starch | Replicate | DP6-12 (v-to-v, %) | DP13-24 (v-to-v, %) | Ratio (%) |
|---|---|---|---|---|
| Native waxy tapioca starch | 1 | 28.50 | 47.84 | 25.3 |
|  | 2 | 28.48 | 48.01 | 25.5 |
|  | 3 | 28.25 | 47.68 | 25.6 |
| Sample 1 | 1 | 29.20 | 47.78 | 24.1 |
|  | 2 | 29.37 | 47.70 | 23.8 |
|  | 3 | 29.20 | 47.70 | 24.1 |
| Sample 2 | 1 | 28.99 | 47.87 | 24.6 |
|  | 2 | 28.92 | 47.15 | 24.0 |
| Sample 3 | 1 | 28.78 | 47.77 | 24.8 |
|  | 2 | 28.90 | 47.50 | 24.3 |
| Native waxy maize starch | 1 | 25.45 | 51.54 | 33.9 |
|  | 2 | 26.54 | 51.80 | 32.2 |
|  | 3 | 25.53 | 51.40 | 33.6 |
| Sample 5 | 1 | 25.98 | 51.48 | 32.9 |
|  | 2 | 26.37 | 51.96 | 32.7 |
|  | 3 | 26.24 | 51.92 | 32.9 |
| Sample 6 | 1 | 25.98 | 51.49 | 32.9 |
|  | 2 | 26.90 | 51.72 | 31.6 |
|  | 3 | 26.40 | 51.42 | 32.2 |
| Sample 7 | 1 | 26.57 | 51.47 | 31.9 |
|  | 2 | 26.66 | 51.52 | 31.8 |
|  | 3 | 26.48 | 51.60 | 32.2 |

Example 3—Freeze-Thaw Stability of Inhibited Waxy Starches

A set of experiments was performed to investigate various textural attributes with respect to freeze-thaw stability of the starches of the disclosure. To evaluate textural attributes, various starches of the disclosure and commercial inhibited waxy starches based on maize, wheat, or tapioca were cooked at 5% solids in deionized water by suspending a container (i.e. glass jar) containing the slurry in a 95° C. water bath and stirring with a glass rod or metal spatula for 8 minutes, then covering the container and allowing the paste to remain at 95° C. for an additional 20 minutes. The container was removed from the bath and allowed to cool on the bench. The resulting paste was brought back to the initial weight by addition of water (i.e. to replace any evaporated water) and mixed well. The glass jars that were to be used for the first, second and third freeze-thaw cycles were placed into a freezer (−18° C.) such that the jars did not touch, and such that the jars were not in a container or box or otherwise insulated. The jars were allowed to rest overnight (16-18 h). The samples were removed from the freezer and place onto a laboratory countertop such that the jars do not touch. The jars were allowed to warm to room temperature for at least 6 hours. This completed the first freeze-thaw cycle. The samples that were to be subjected to the second and third freeze cycles were returned to the freezer to repeat the freezing and thawing steps. Samples were evaluated by panelists both on the day of cook, and following each of three freeze/thaw cycles. The starches investigated were Sample 6; Comparative starch A; and Sample 2 described in Table 2. Comparative starch A is a modified waxy maize starch and is prepared under esterification with acetic anhydride and adipic anhydride, in which acetyl groups are 1.2-1.5% by weight of starch and adipate groups are 0.1% by weight of starch.

Panelists evaluated Opacity, Firmness, Syneresis and Graininess as described below. Each attribute was rated on a 15 point line scale. References with different ratings were provided to each group.

Firmness was determined by comparison with commercially available products:
  Firmness 3—Suave Creamy almond & verbena Body Wash
  Firmness 7—Shea Moisture Coconut & Hibiscus Curling Gel Souffle w/Agave Nectar & Flax Seed Oil
  Firmness 11—Garnier Power Putty Surfer Hair To determine firmness, the back of a spoon was used to prod the test starches and reference products 2-3 times; the force against the spoon was estimated for the test starches with respect to the reference products. Higher numbers indicate higher firmness.

Figure 3:
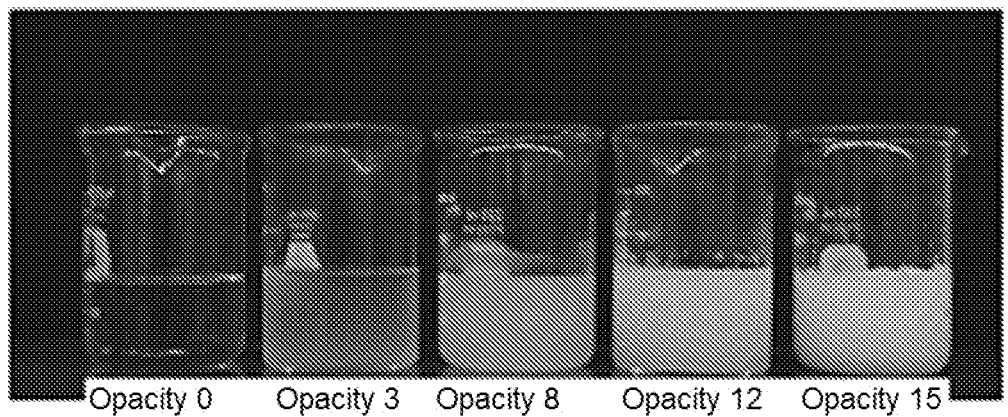
FIG. 3 is a photograph of standards for opacity used in the experiments described in the examples.

Opacity was determined by comparison with the pictures of FIG. 3, with the test starches in a 250 mL beaker, about 1 inch in front of a black background. Higher numbers indicate higher opacity.

Figure 4:
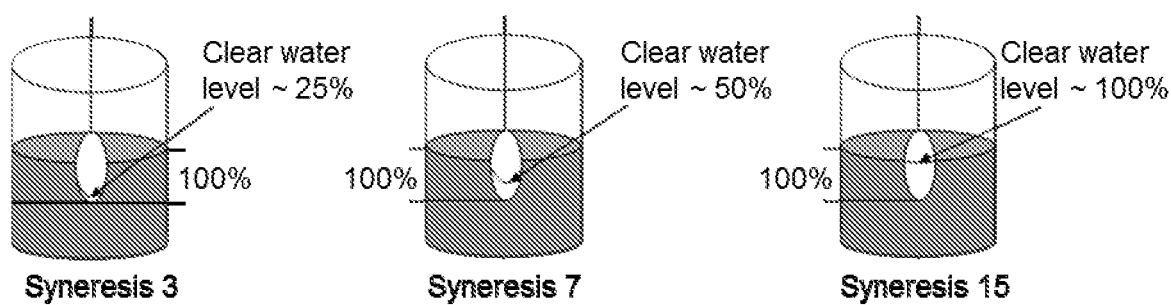
FIG. 4 is a diagram demonstrating the syneresis experiments performed in the examples.

Syneresis was determined by holding a plastic spoon at a 45 degree angle against the test sample surface, gently pressing the test sample about halfway down, and observing from the side how much clear water was squeezed out in 3 seconds. The level of syneresis was determined by comparison with the pictures of FIG. 4.

Figure 5:
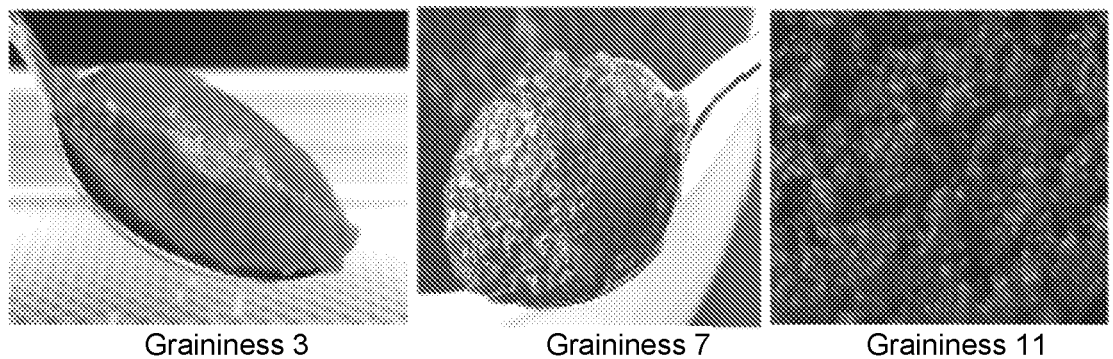
FIG. 5 is a set of photographs of standards for graininess used in the experiments described in the examples.

Graininess (i.e., surface graininess) was determined by observing the top surface of the test starch and comparing it with the pictures of FIG. 5.

Figure 6:
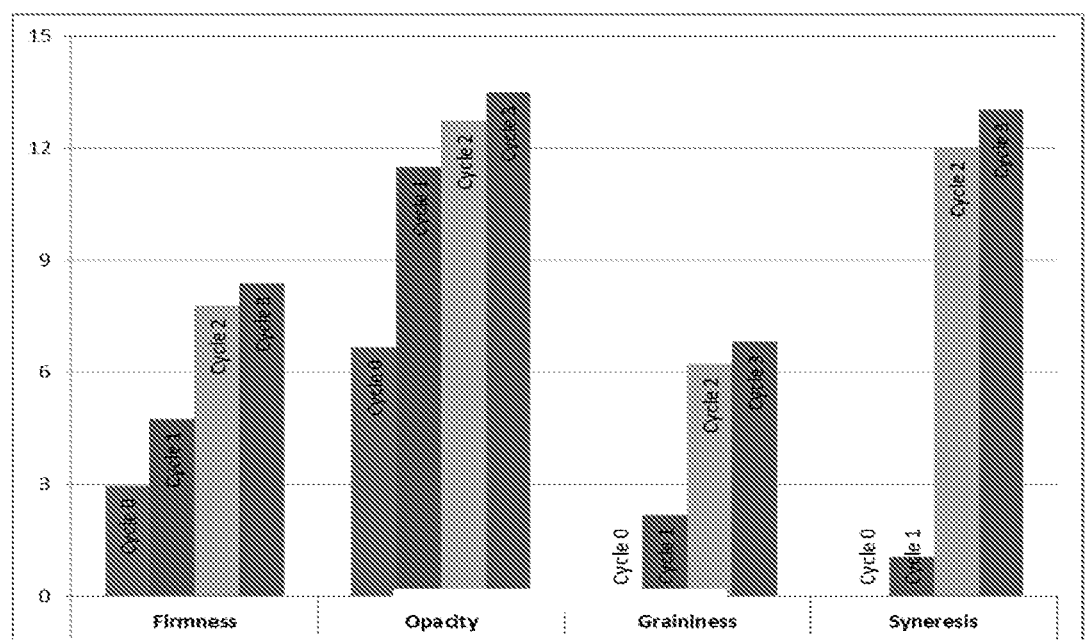
FIGS. 6-8 are a set of bar graphs showing average values for opacity, syneresis and graininess through the time course of the freeze-thaw experiments described in the examples.
Figure 7:
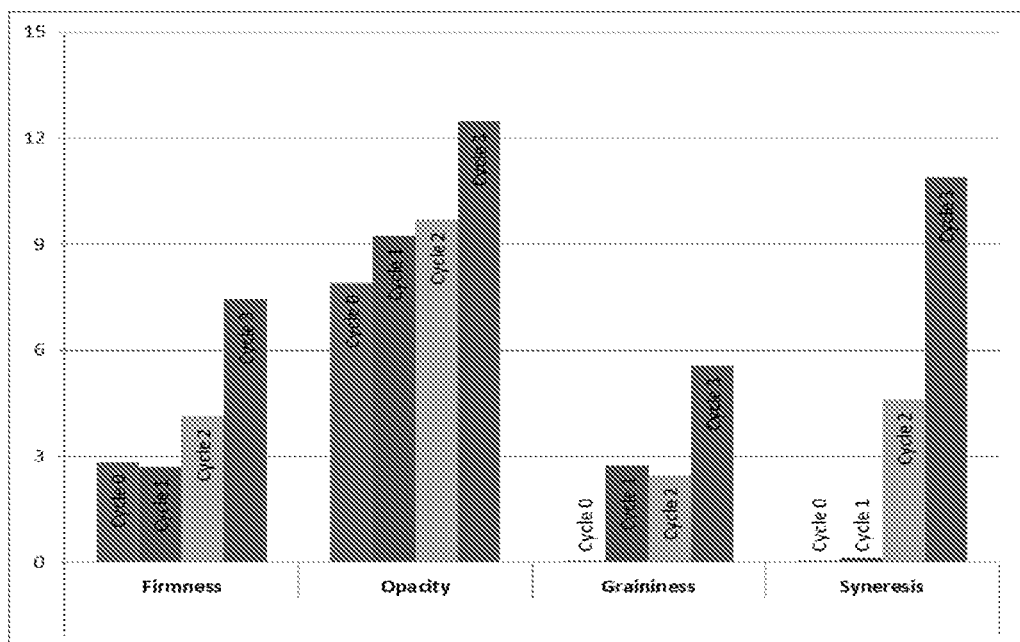
Figure 8:
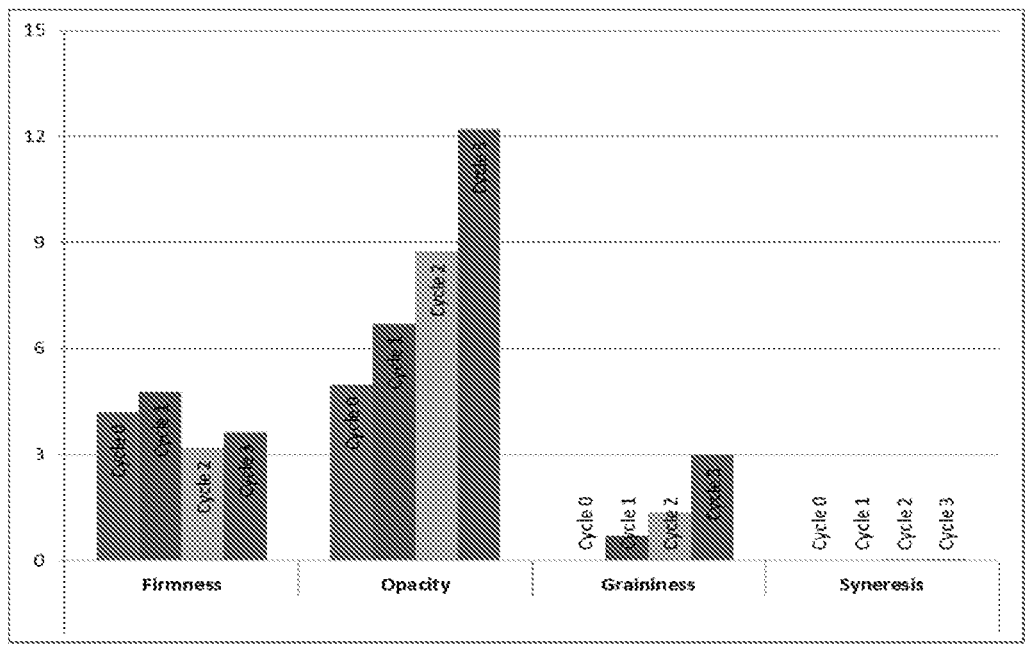

FIGS. 6-8 provide bar graphs showing the average values for the three tested attributes of each product (respectively, Sample 6; Comparative starch A; and Sample 2) over the course of the freeze/thaw cycles. Unlike Sample 6 and Comparative Starch A, the inhibited waxy tapioca starch of the disclosure (Sample 2) had good freeze/thaw stability.

Figure 9:
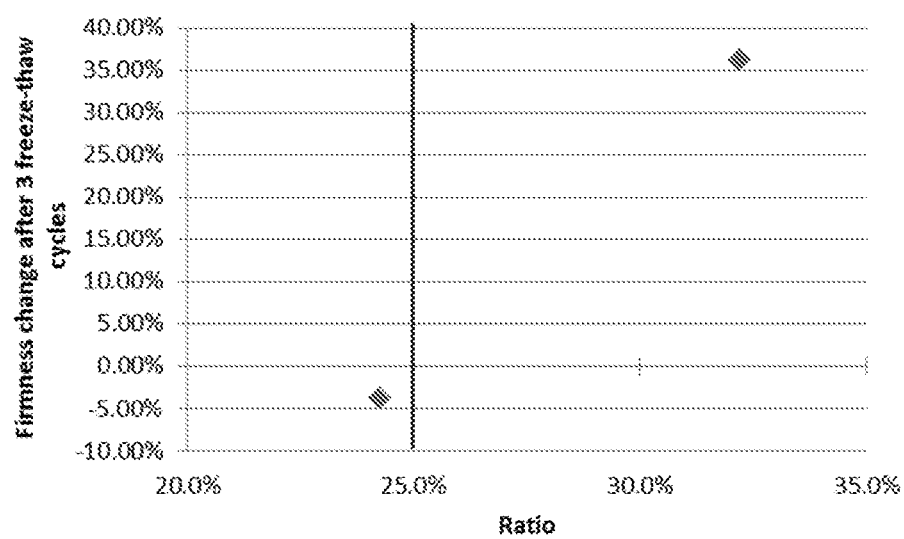
FIG. 9 is a graph of firmness change after three freeze-thaw cycles vs. the ratio (DP13-24−DP6-12)/(DP13-24+DP6-12) as measured by the valley-to-valley method in the experiments described in the examples.

FIG. 9 demonstrates that there is a correlation between the ratio described above and starch freeze-thaw stability. The change of firmness after three freeze-thaw cycles is a measurement of starch stability and calculated as the difference between firmness after three freeze-thaw cycles and firmness of fresh sample, divided by the total scale of ballot. Here the total scale of ballot was 15 as described above. When the ratio is no more than 25.5%, the firmness change is negligible; while the ratio is above 25.5%, the change of firmness is significant, indicating that the freeze-thaw stability is poor.

Example 4 Branch Chain Length Distribution Analysis—Drop-to-Baseline Method

Branch chain length distributions were determined as described above for inhibited waxy tapioca starches described herein and for commercial inhibited starches, using the drop-to-baseline method; data are average of two replicates. The results are shown in the table below, which indicates that the inhibited waxy tapioca starches of the disclosure have an amylopectin fraction with DP13-24 of no more than 54.5%, while other commercial inhibited starches have an amylopectin fraction with DP13-24 in excess of 54.5%; that the inhibited waxy tapioca starches of the disclosure have an amylopectin fraction with DP6-12 of at least 30.5%, while other commercial inhibited starches have an amylopectin fraction with DP6-12 of less than 30.5%; and that the inhibited waxy tapioca starches of the disclosure have a ratio (DP13-24−DP6-12)/(DP13-24+DP6-12) no more than 28.0%, while other inhibited starches have a ratio (DP13-24−DP6-12)/(DP13-24+DP6-12) greater than 28.0%.

TABLE 3

Drop-to-baseline branch chain length profiles of inhibited starches

| Type | DP6-12 (d-to-b, %) | DP13-24 (d-to-b, %) | ratio (%) |
|---|---|---|---|
| Clean-label inhibited waxy maize starch, low stability - Sample 5 of Table 1 | 28.54 | 56.66 | 33.01 |
| Clean-label inhibited waxy maize starch, low stability - Sample 6 of Table 1 | 27.76 | 57.70 | 35.03 |
| Clean-label inhibited waxy maize starch low stability - Sample 7 of Table 1 | 28.05 | 57.73 | 34.60 |
| Clean-label inhibited waxy maize starch, high stability | 30.33 | 55.31 | 29.16 |
| Clean-label inhibited waxy maize starch, high stability | 29.52 | 55.98 | 30.95 |
| Highly-inhibited waxy tapioca starch - Sample 1 of Table 1 | 31.69 | 54.18 | 26.19 |
| Medium-inhibited waxy tapioca starch - Sample 2 of Table 1 | 31.89 | 54.06 | 25.79 |
| Low-inhibited waxy tapioca starch - Sample 3 of Table 1 | 31.48 | 54.25 | 26.56 |
| Low-inhibited waxy tapioca starch | 31.27 | 54.34 | 26.96 |
| Medium-inhibited waxy tapioca starch | 30.63 | 52.80 | 26.58 |
| Highly-inhibited waxy tapioca starch | 31.55 | 52.40 | 24.84 |
| Medium-inhibited waxy tapioca starch | 30.98 | 52.81 | 26.05 |
| Low-inhibited waxy tapioca starch | 31.58 | 52.54 | 24.92 |
| Low-inhibited waxy tapioca starch | 31.94 | 52.48 | 24.33 |
| Medium-inhibited waxy tapioca starch | 31.82 | 52.45 | 24.48 |
| Medium-inhibited waxy tapioca starch | 32.31 | 52.34 | 23.67 |
| Medium-inhibited waxy tapioca starch | 32.84 | 52.17 | 22.73 |
| Highly-inhibited waxy tapioca starch | 32.71 | 52.32 | 23.07 |
| Highly-inhibited waxy tapioca starch | 32.65 | 52.55 | 23.36 |

What is claimed is:

1. An inhibited waxy tapioca starch having
  an amylopectin content in the range of 90-100%; and
  a sedimentation volume in the range of 18-35 mL/g;
  wherein
    the amylopectin fraction of the inhibited waxy tapioca starch has no more than 48.5% medium-length branches having a chain length (degree of polymerization) from 13-24 as measured by the valley-to-valley method, and/or
    at least 28.0% short-length branches having a chain length from 6-12 as measured by the valley-to-valley method, and/or
    the ratio (DP13-24−DP6-12)/(DP13-24+DP6-12) is no more than 25.5%, in which DP13-24 is the amount in the amylopectin fraction of the inhibited waxy tapioca starch of medium-length branches having the chain length from 13-24, and DP6-12 is the amount in the amylopectin fraction of the inhibited waxy tapioca starch of short-length branches having the chain length from 6-12 as measured by the valley-to-valley method; and wherein the inhibited waxy tapioca starch is prepared by adjusting an aqueous slurry of a tapioca starch feedstock to a pH in the range of 3.5-7.0 followed by drying and heating the starch and is not pregelatinized.

2. The inhibited waxy tapioca starch according to claim 1, wherein the amylopectin fraction of the inhibited waxy tapioca starch has no more than 48.0% medium-length branches having the chain length from 13-24 as measured by the valley-to-valley method.

3. The inhibited waxy tapioca starch according to claim 1, wherein the amylopectin fraction of the inhibited waxy tapioca starch has 46.0%-48.5% medium-length branches having the chain length from 13-24 as measured by the valley-to-valley method.

4. The inhibited waxy tapioca starch according to claim 1, wherein the amylopectin fraction of the inhibited waxy tapioca starch has at least 28.5% short-length branches having the chain length from 6-12 as measured by the valley-to-valley method.

5. The inhibited waxy tapioca starch according to claim 1, wherein the amylopectin fraction of the inhibited waxy tapioca starch has 28.0%-31.0% short-length branches having the chain length from 6-12 as measured by the valley-to-valley method.

6. The inhibited waxy tapioca starch according to claim 1, wherein the ratio (DP13-24−DP6-12)/(DP13-24+DP6-12) is no more than 25.0%.

7. The inhibited waxy tapioca starch according to claim 1, wherein the ratio (DP13-24−DP6-12)/(DP13-24+DP6-12) is 22.0%-25.5%.

8. An inhibited waxy tapioca starch having
an amylopectin content of at least 99%; and
a sedimentation volume in the range of 18-35 mL/g;
wherein
the amylopectin fraction of the inhibited waxy tapioca starch has no more than 48.5% medium-length branches having a chain length (degree of polymerization) from 13-24 as measured by the valley-to-valley method, and/or
at least 28.0% short-length branches having a chain length from 6-12 as measured by the valley-to-valley method, and/or
the ratio (DP13-24−DP6-12)/(DP13-24+DP6-12) is no more than 25.5%, in which DP13-24 is the amount in the amylopectin fraction of the inhibited waxy tapioca starch of medium-length branches having the chain length from 13-24, and DP6-12 is the amount in the amylopectin fraction of the inhibited waxy tapioca starch of short-length branches having the chain length from 6-12 as measured by the valley-to-valley method; and
wherein the inhibited waxy tapioca starch is prepared by adjusting an aqueous slurry of a tapioca starch feedstock to a pH in the range of 3.5-7.0 followed by drying and heating the starch and is not pregelatinized.

9. The inhibited waxy tapioca starch according to claim 1, wherein the inhibited waxy tapioca starch has no more than 48.0% medium-length branches having the chain length from 13-24 as measured by the valley-to-valley method, and at least 28.5% short-length branches having the chain length from 6-12 as measured by the valley-to-valley method; and wherein the ratio (DP13-24−DP6-12)/(DP13-24+DP6-12) is no more than 25.0%.

10. The inhibited waxy tapioca starch according to claim 1, wherein the inhibited waxy tapioca starch has a sedimentation volume in the range of 20-35 mL/g.

11. The inhibited waxy tapioca starch according to claim 1, wherein the inhibited waxy tapioca starch has a Yellowness Index of no more than 10.

12. The inhibited waxy tapioca starch according to claim 1 wherein the inhibited waxy tapioca starch is not hydroxypropylated, is not acetylated, is not carboxymethylated, is not hydroxyethylated, is not phosphated, is not succinated, is not cationic or zwitterionic, is not crosslinked with phosphate, is not crosslinked with adipate, is not crosslinked with epichlorohydrin, is not crosslinked with acrolein, and is not bleached or oxidized with peroxide or hypochlorite.

13. The inhibited waxy tapioca starch according to claim 1, wherein the inhibited waxy tapioca starch has a viscosity in the range of 50-1500 cP in a Rapid Visco Analyzer (RVA) test.

14. The inhibited waxy tapioca starch according to claim 1, wherein the inhibited waxy tapioca starch has
a viscosity as measured by RVA in the range of 50-1500 cP; and
one or more of 1) a graininess of 4 or less after three freeze-thaw cycles, 2) a syneresis of 5 or less, or even 3 or less after three freeze-thaw cycles, and 3) a change in firmness of no more than 2 units after three freeze-thaw cycles.

15. The inhibited waxy tapioca starch according to claim 1, wherein the inhibited waxy tapioca starch has good digestive tolerance.

16. A food product including an inhibited waxy tapioca starch according to claim 1, in a cooked form.

17. An inhibited waxy tapioca starch having
an amylopectin content in the range of 90-100%; and
a sedimentation volume in the range of 18-35 mL/g;
wherein the amylopectin fraction of the inhibited waxy tapioca starch has a DP13-24 value that is at least 3 percentage points greater than the DP13-24 value for native waxy rice starch, but at least 3 percentage points less than the DP13-24 value for native waxy maize starch, and
wherein the inhibited waxy tapioca starch is prepared by adjusting an aqueous slurry of a tapioca starch feedstock to a pH in the range of 3.5-7.0 followed by drying and heating the starch and is not pregelatinized.

18. The inhibited waxy tapioca starch according to claim 17, wherein the inhibited waxy tapioca starch has an amylopectin content of at least 99%.

19. The inhibited waxy tapioca starch according to claim 1, wherein the inhibited waxy tapioca starch is not hydroxypropylated, is not acetylated, is not carboxymethylated, is not hydroxyethylated, is not phosphated, is not succinated, is not cationic or zwitterionic, is not crosslinked with phosphate, is not crosslinked with adipate, is not crosslinked with epichlorohydrin, and is not crosslinked with acrolein.

20. The inhibited waxy tapioca starch according to claim 6, wherein the inhibited waxy tapioca starch is not hydroxypropylated, is not acetylated, is not carboxymethylated, is not hydroxyethylated, is not phosphated, is not succinated, is not cationic or zwitterionic, is not crosslinked with phosphate, is not crosslinked with adipate, is not crosslinked with epichlorohydrin, and is not crosslinked with acrolein.

21. The inhibited waxy tapioca starch according to claim 8, wherein the inhibited waxy tapioca starch is not hydroxypropylated, is not acetylated, is not carboxymethylated, is not hydroxyethylated, is not phosphated, is not succinated, is not cationic or zwitterionic, is not crosslinked with phosphate, is not crosslinked with adipate, is not crosslinked with epichlorohydrin, and is not crosslinked with acrolein.

22. The inhibited waxy tapioca starch according to claim 21, wherein the inhibited waxy tapioca starch is further not bleached or oxidized with peroxide or hypochlorite.

23. The inhibited waxy tapioca starch according to claim 14, wherein the inhibited waxy tapioca starch is not hydroxypropylated, is not acetylated, is not carboxymethylated, is not hydroxyethylated, is not phosphated, is not succinated, is not cationic or zwitterionic, is not crosslinked with phosphate, is not crosslinked with adipate, is not crosslinked with epichlorohydrin, and is not crosslinked with acrolein.

24. The inhibited waxy tapioca starch according to claim 23, wherein the inhibited waxy tapioca starch is further not bleached or oxidized with peroxide or hypochlorite.

25. The inhibited waxy tapioca starch according to claim 17, wherein the inhibited waxy tapioca starch is not hydroxypropylated, is not acetylated, is not carboxymethylated, is not hydroxyethylated, is not phosphated, is not succinated, is not cationic or zwitterionic, is not crosslinked with phosphate, is not crosslinked with adipate, is not crosslinked with epichlorohydrin, and is not crosslinked with acrolein.

26. The inhibited waxy tapioca starch according to claim 25, wherein the inhibited waxy tapioca starch is further not bleached or oxidized with peroxide or hypochlorite.

27. The food product according to claim 16, wherein the food product is a tomato-based product, a gravy, a sauce, a soup, a pudding, a salad dressing, a yogurt, a jam or jelly, a gelatin dessert, a snack bar, a frosting, a glaze, an icing, a tortilla, an infant or toddler food, a batting or breading, a creamer, a sour cream, a pudding, a custard, a cheese product, a fruit filling or topping, a cream filling or topping, a syrup, a beverage, a glaze, a condiment, a confectionary, a pasta, a frozen food, a cereal, a soup, or a baked good.

* * * * *